US012079903B1

(12) United States Patent
Rivas Vetencourt et al.

(10) Patent No.: US 12,079,903 B1
(45) Date of Patent: Sep. 3, 2024

(54) REAL SCREENS IN EXTENDED REALITY

(71) Applicant: Google LLC, Mountain View, CA (US)

(72) Inventors: Diego Rivas Vetencourt, San Francisco, CA (US); Yilong Yao, San Jose, CA (US); David Kim, Zug (CH); Steven Soon Leong Toh, Alameda, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 18/341,461

(22) Filed: Jun. 26, 2023

(51) Int. Cl.
G06F 3/01 (2006.01)
G06T 7/70 (2017.01)
G06T 11/00 (2006.01)
G06V 20/20 (2022.01)
G06V 20/40 (2022.01)
G06K 7/14 (2006.01)
H04L 67/131 (2022.01)

(52) U.S. Cl.
CPC ............ *G06T 11/00* (2013.01); *G06F 3/011* (2013.01); *G06F 3/017* (2013.01); *G06T 7/70* (2017.01); *G06V 20/20* (2022.01); *G06V 20/41* (2022.01); *G06K 7/1417* (2013.01); *G06T 2207/10016* (2013.01); *G06T 2207/30196* (2013.01); *H04L 67/131* (2022.05)

(58) Field of Classification Search
CPC . G06T 11/00; G06T 7/70; G06T 2207/10016; G06T 2207/30196; G06F 3/011; G06F 3/017; G06V 20/20; G06V 20/41; G06K 7/1417; H04L 67/131
See application file for complete search history.

(56) References Cited

U.S. PATENT DOCUMENTS

| 10,055,028 | B2 * | 8/2018 | Toff | G06F 3/011 |
| 10,147,243 | B2 * | 12/2018 | Yamamoto | G06F 3/011 |
| 10,334,076 | B2 * | 6/2019 | McKenzie | G06F 3/011 |
| 10,338,673 | B2 * | 7/2019 | Chen | G06V 40/10 |
| 10,852,839 | B1 * | 12/2020 | Ravasz | G06F 3/017 |
| 11,086,392 | B1 * | 8/2021 | Sztuk | G06F 3/1423 |
| 11,175,791 | B1 * | 11/2021 | Patnaikuni | G06F 3/017 |
| 2013/0234850 | A1 * | 9/2013 | Lee | A61B 5/6898 340/539.12 |

(Continued)

Primary Examiner — Ibrahim A Khan
(74) Attorney, Agent, or Firm — DORITY & MANNING P.A.

(57) ABSTRACT

Methods and systems for displaying screens in extended reality are disclosed herein. The method can include receiving video data of a real-world environment of a user of an extended reality device and identifying a screen of a separate computing device in the video data. The method can also include pairing the extended reality device and the separate computing device, generating a graphical outline around the screen of the separate computing device, and displaying, by the processor, the screen of the separate computing device and the graphical outline around the screen of the separate computing device on a display of the extended reality device. The method can further include detecting a user interaction with the graphical outline around the screen of the separate computing device based on the received video data and in response to detecting the user interaction, performing an action associated with the user interaction.

20 Claims, 6 Drawing Sheets

(56) References Cited

U.S. PATENT DOCUMENTS

| | | | | |
|---|---|---|---|---|
| 2014/0266983 A1* | 9/2014 | Christensen | ........ | A61M 1/1601 |
| | | | | 345/8 |
| 2015/0302869 A1* | 10/2015 | Tomlin | .................... | G10L 25/48 |
| | | | | 704/246 |
| 2016/0071319 A1* | 3/2016 | Fallon | .................... | G09G 5/003 |
| | | | | 345/633 |
| 2017/0076502 A1* | 3/2017 | Chen | ........................ | G06F 3/011 |
| 2017/0185276 A1* | 6/2017 | Lee | ..................... | G06F 3/04847 |
| 2017/0244811 A1* | 8/2017 | McKenzie | ........... | G02B 27/017 |

\* cited by examiner

REAL SCREENS IN EXTENDED REALITY

FIELD

The present disclosure relates generally to extended reality display. More particularly, the present disclosure describes systems and methods for identifying and displaying screens of separate computing devices as virtual components of an extended reality display and enabling manipulation of the screens by the user in the extended reality display.

BACKGROUND

Extended reality (XR) is an umbrella term that refers to the combination of virtual reality (VR), augmented reality (AR), and/or mixed reality (MR) technologies.

Virtual reality is an immersive experience where users are completely immersed in a computer-generated environment. Augmented reality is a technology that overlays digital information or objects onto the real world. Mixed reality is a combination of virtual and augmented reality, allowing users to interact with digital objects in the real world.

Extended reality technologies enable users to experience a heightened sense of immersion and interactivity, which can be used in a variety of fields, including entertainment, education, healthcare, and business. By blending the physical and virtual worlds, extended reality has the potential to transform how we interact with and understand our environment.

Thus, XR technology can immerse a user in a virtual environment (virtual reality, or "VR"), add to or augment a real world environment of the user by displaying virtual components overlaid on video data of the real world environment (augmented reality, or "AR"), or both.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method for displaying a screen in extended reality. The method can include receiving, by a processor, video data of a real-world environment of a user of an extended reality device and identifying, by the processor, a screen of a separate computing device in the video data. the method can also include pairing, by the processor, the extended reality device and the separate computing device, generating, by the processor, a graphical outline around the screen of the separate computing device, and displaying, by the processor, the screen of the separate computing device and the graphical outline around the screen of the separate computing device on a display of the extended reality device, wherein the displayed screen on the display of the extended reality device has at least one display characteristic different from the screen being displayed on the separate computing device. The method further includes detecting, by the processor, a user interaction with the graphical outline around the screen of the separate computing device based on the received video data and, in response to detecting the user interaction, performing, by the processor, an action associated with the user interaction.

Another example aspect of the present disclosure is directed to a computing system for displaying screens in extended reality. The computing system can include one or more processors and one or more non-transitory computer-readable media that store instructions that, when executed by the one or more processors, cause the computing system to perform operations. The operations can include receiving video data of a real-world environment of a user of an extended reality device and identifying a screen of a separate computing device in the video data. The operations can also include pairing the extended reality device and the separate computing device, generating a graphical outline around the screen of the separate computing device, and displaying the screen of the separate computing device and the graphical outline around the screen of the separate computing device on a display of the extended reality device, wherein the displayed screen on the display of the extended reality device has at least one display characteristic different from the screen being displayed on the separate computing device. The operations can further include detecting a user interaction with the graphical outline around the screen of the separate computing device based on the received video data and, in response to detecting the user interaction, performing an action associated with the user interaction.

A further example aspect of the present disclosure is directed to one or more non-transitory computer-readable media that store instructions that, when executed by one or more processors, cause the one or more processors to perform operations. The operations can include receiving video data of a real-world environment of a user of an extended reality device and identifying a screen of a separate computing device in the video data. The operations can also include pairing the extended reality device and the separate computing device, generating a graphical outline around the screen of the separate computing device, and displaying the screen of the separate computing device and the graphical outline around the screen of the separate computing device on a display of the extended reality device, wherein the displayed screen on the display of the extended reality device has at least one display characteristic different from the screen being displayed on the separate computing device. The operations can further include detecting a user interaction with the graphical outline around the screen of the separate computing device based on the received video data and, in response to detecting the user interaction, performing an action associated with the user interaction.

BRIEF DESCRIPTION OF THE DRAWINGS

Detailed discussion of embodiments directed to one of ordinary skill in the art is set forth in the specification, which makes reference to the appended figures, in which.

DETAILED DESCRIPTION

Figure 1B:
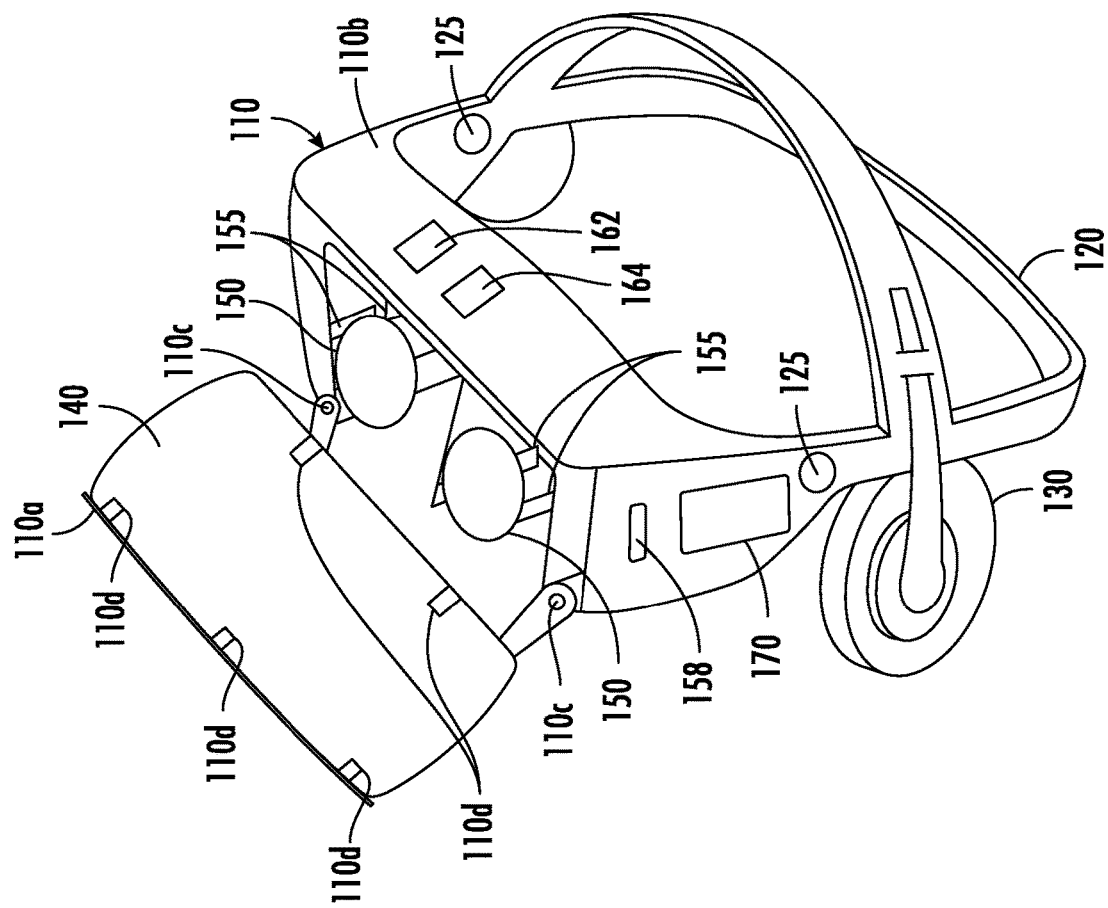
FIG. 1B depicts a perspective view of a head-mounted device according to example embodiments of the present disclosure.

Generally, the present disclosure is directed to an extended reality (XR) device that can pair with one or more separate computing devices. The XR device can replicate the screens of the one or more separate computing devices in an XR display environment associated with the XR device. This can allow a user to interact with screens displayed from those computing devices in the display environment of the XR device, rather than needing to interact with the actual separate devices, thereby improving the immersiveness of the XR device.

More specifically, certain XR devices may allow users to view various virtual components (e.g., fully virtual environments in virtual reality and/or virtual components overlaid on live video data in augmented reality). However, users of XR devices may wish to use a separate computing device, such as a smartphone, laptop computer, a desktop computer, and the like while still using the XR device. Normally, this includes the user turning on a passthrough mode for the XR device, which then displays only live video data of the environment around the user.

As a solution to this problem, the present disclosure enables the user to have the XR device they are using (e.g., wearing) identify and pair with other computing devices. There are several techniques that can be used to pair the XR device and the other computing device, such as Bluetooth pairing, Wi-Fi Direct, QR code scanning, and/or cable connection. For example, QR code scanning can include generating a QR code on the other computing device using a QR code generator or application. Then, a QR code scanner on the XR device can scan the code. This can enable a connection to be established between the devices.

In some implementations, the XR device is equipped with technology that allows it to automatically detect or recognize the screen of other computing devices. This means that the XR device is able to identify the presence and characteristics of a separate screen, such as its size, resolution, and orientation, without requiring any input from the user. In one example, the XR device can include sensors such as cameras or infrared sensors. These sensors can capture information about the surrounding environment and use algorithms to identify the screen of the other computing device. Alternatively, the XR device may use wireless protocols, such as Bluetooth or Wi-Fi, to communicate with the other computing device and obtain information about its screen.

Automatic screen detection or recognition can provide a number of benefits for XR device users. For example, it can streamline the pairing process by eliminating the need for manual input or configuration. Additionally, it can ensure that the XR display environment is properly calibrated and optimized for the other computing device's screen, resulting in a more seamless and immersive user experience. Automatic screen detection or recognition is an innovative feature that can enhance the functionality and usability of XR devices in a variety of settings, from gaming and entertainment to education and training.

In some implementations, the XR device can highlight a detected and/or paired screen by placing a virtual border around it in the XR display environment. This means that the user can easily identify when screens have been detected by the XR device and/or paired with the XR device. The highlighting of a detected screen can be accomplished through a variety of techniques, depending on the specific implementation of the XR technology. For example, the XR device may use sensors or wireless protocols to identify the location and orientation of the paired computing device's screen, and then overlay a virtual border or other visual cue onto the corresponding location in the XR display environment.

Once the XR device has been paired with the other computing device, the XR device can receive data about the content that is currently being displayed on the computing device(s) with which the XR device has been paired. This means that any data that is being outputted to the screen of the paired computing device can also be sent to the XR device's display environment. The type of data that can be received depends on the specific implementation of the pairing technology. In some cases, the XR device may be able to receive a live video stream of the content being displayed on the computing device's screen, effectively mirroring the screen in the XR display environment. In other cases, the XR device may receive data about the content, such as metadata or text, which can then be used to display the content in a different format or context within the XR environment, such as in an enlarged format.

In some implementations, the user can be able to perform intuitive interactions with screen(s) detected and/or paired with XR device. For example, the user can perform one or more gestures to "drag and drop" the highlighted screen to create a virtual mirrored screen in the XR display environment. This means that the user can seamlessly integrate the content being displayed on the paired computing device(s) with the XR environment, enabling them to interact with the content in new and immersive ways.

The process of creating a virtual mirrored screen can vary depending on the specific implementation of the XR technology. In some cases, the user may simply need to drag the highlighted screen to a desired location within the XR environment to create the virtual mirrored screen. In other cases, the user may need to initiate a specific command or gesture to trigger the creation of the virtual mirrored screen.

The XR device can replicate the content that is being displayed on the other computing devices as a graphical overlay (e.g., a "virtual screen") within the display environment of the XR device. This enables the user to interact with the virtual screens by, for example, rearranging the virtual screens to fit a user-desired layout in the display, resizing the virtual screens, interacting with elements on the virtual screen (e.g., such as hitting a next page button and the like), and other actions.

This allows the user to continue working with multiple screens while remaining within the display environment of the XR device. This improves the user experience of the XR device by enabling the user to have better control of displayed virtual content on the XR device without requiring the user to remove themselves from the immersive XR environment (e.g., by removing the XR headset or viewing and/or operating other computing devices while the XR device is in a passthrough mode).

Thus, the present disclosure proposes a system where the XR device is able to automatically identify and pair with other computing devices. This system can utilize communication technologies such as Bluetooth or Wi-Fi to establish a connection between the devices. Once connected, the user can access the information or applications on the separate computing devices through the XR display environment. This allows for a seamless and efficient user experience, where the user can switch between devices without having to remove the XR device or manually pair the devices each time.

Overall, the proposed solution provides a more streamlined and user-friendly experience for those using XR devices. By automating the pairing process, users can focus on their tasks at hand without having to worry about technical difficulties or disruptions. This innovation has the potential to enhance productivity and efficiency in a variety of settings, such as business, education, and healthcare, where XR technologies are increasingly being used. Furthermore, the ability to receive data about the content being displayed on paired computing devices can provide a number of benefits for XR device users. For example, it can allow users to seamlessly switch between devices and access information or applications from multiple sources within a single display environment. Additionally, it can enable XR applications and experiences to be enhanced or augmented by data from external sources, such as social media feeds or real-time environmental data.

The present disclosure provides a number of technical effects and benefits. As one example, by providing a seamless and immersive integration of multiple screens within the XR environment, the technology enhances the user experience by enabling users to interact with multiple sources of digital content simultaneously. This allows for more efficient workflows and collaborative efforts, particularly in remote work settings, where users can view and manipulate content from a variety of sources in real-time.

The technology also offers technical benefits in terms of the virtual mirroring process. By detecting and recognizing screens of other computing devices and creating virtual borders and mirrored screens, the technology facilitates the transmission of data between the XR device and the paired computing devices, offering a streamlined and efficient approach to integrating digital content within an XR environment.

In addition to these benefits, the proposed technology offers a technical solution to a technical problem, namely the challenge of integrating multiple sources of digital content within an XR environment. By providing a solution to this problem, the technology offers a unique technical advantage over existing solutions, which often require complex and time-consuming manual processes to integrate multiple sources of content within an XR environment. Thus, the proposed technology of enabling an XR device to replicate screens of other computing devices in an XR display environment relates to a technical field, has a technical effect on physical entities, and provides a technical solution to a technical problem.

The proposed approach can provide benefits in a number of applications. As one example, in the field of remote work and collaboration, the ability to seamlessly integrate multiple sources of data and content within an XR environment can enhance productivity and facilitate more efficient and effective communication and collaboration between remote teams. For example, a team of designers or engineers can use XR technology to work collaboratively on complex 3D models, with each member able to view and manipulate the model from their own device within the XR environment.

As another example, in the education sector, XR technology can enable immersive and interactive learning experiences, with students able to view and interact with educational content from a range of sources, including laptops, tablets, and smartphones. The ability to create virtual mirrored screens within the XR environment can also enable teachers to display and manipulate educational content in real-time, enhancing student engagement and facilitating more effective learning outcomes.

With reference now to the Figures, example implementations of the present disclosure will be discussed in further detail.

Figure 1A:
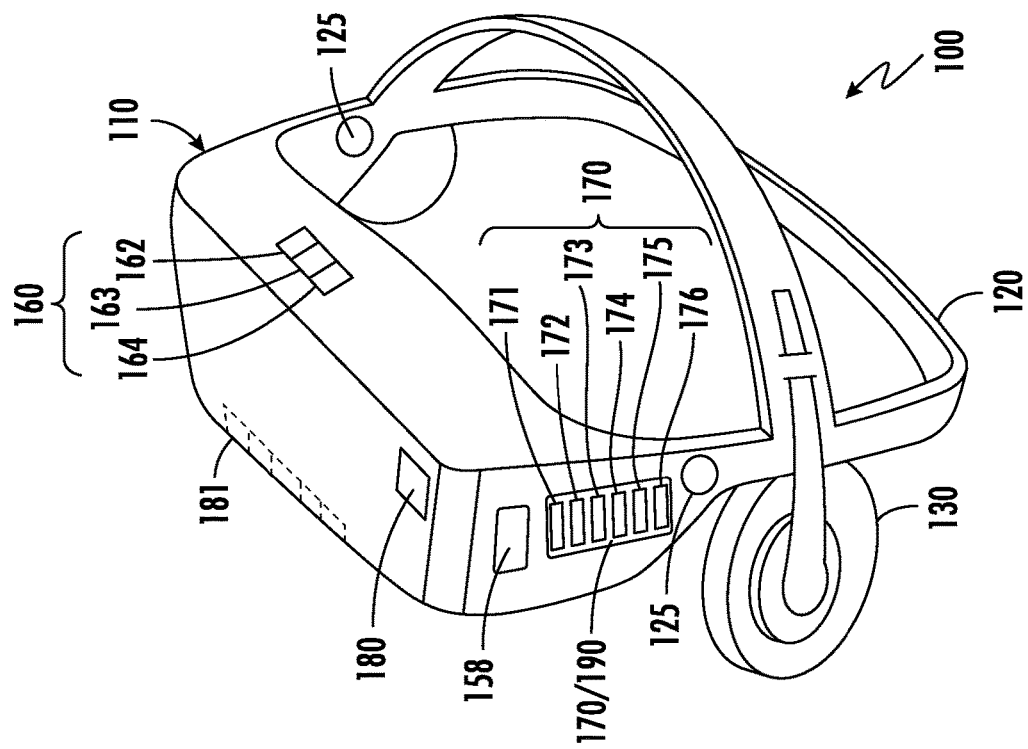
FIG. 1A depicts a perspective view of a head-mounted device according to example embodiments of the present disclosure.
Figure 1C:
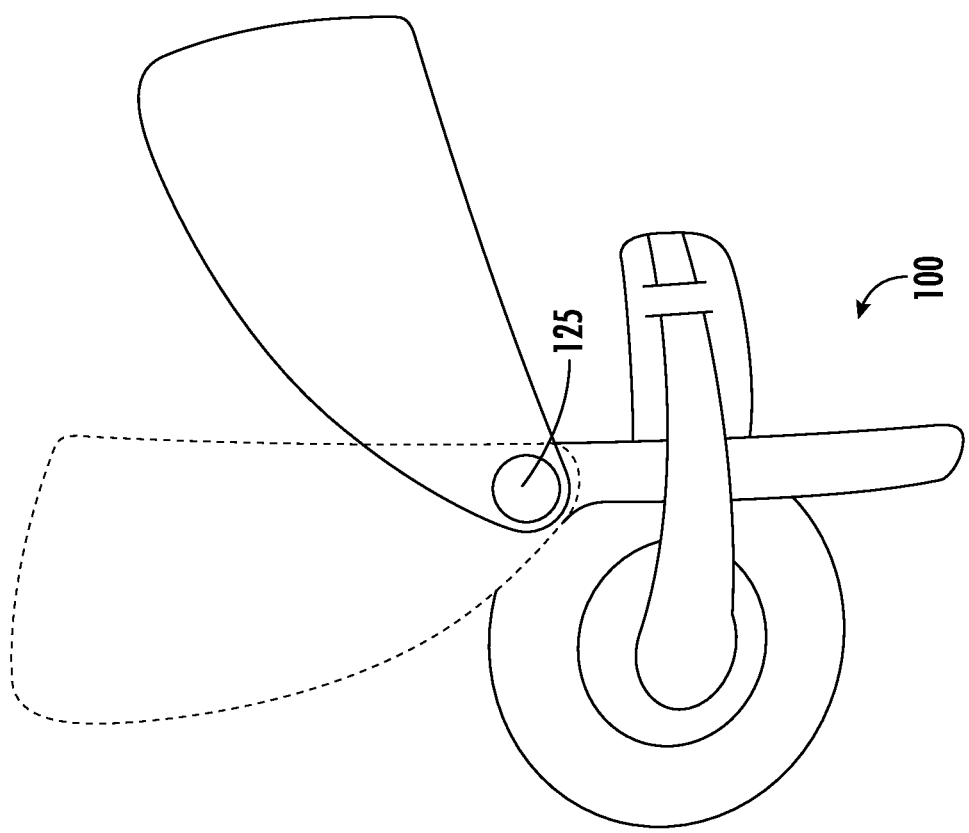
FIG. 1C depicts a side view of a head-mounted device according to example embodiments of the present disclosure.

FIGS. 1A and 1B are perspective views and FIG. 1C is a side view of an example head-mounted device ("HMD") which may be worn by a user to generate an immersive extended reality experience. The HMD shown in FIGS. 1A-C is provided only as one example of an XR device. Other XR devices are possible, including, but not limited to handheld devices (e.g., smartphones or tablets); immersive rooms (e.g., where multiple screens and projectors are used to create a fully immersive XR experience); and/or wearables (e.g., smartwatches or bracelets). The example HMD 100 may include a housing 110 in which optical components may be received. The housing 110 may be coupled, for example, rotatably coupled and/or removably attachable, to a frame 120 which allows the housing 110 to be mounted or worn on a user's head. An audio output device 130 may also coupled to the frame 120, and may include, for example, speakers mounted in headphones and coupled on the frame 120.

As shown in FIG. 1B, a front face 110*a* of the housing 110 rotated away from or otherwise removably attached to a base portion 110*b* of the housing 110. A display 140, such as, for example, a smartphone or other display device, may be mounted on the front face 110*a* of the housing 110. Lenses 150 may be mounted in the housing 110, between the user's eyes and the display 140 when the front face 110*a* is in the closed position against the base portion 110*b* of the housing 110. A position of the lenses 150 may be adjusted by an adjustment device 158, so that the lenses 150 may be aligned with respective optical axes of the user's eyes to provide a relatively wide field of view and relatively short focal length.

The HMD 100 may also include a sensing system 160 including various sensing system devices 162-164 and a control system 170 including various control system devices 171-176 to facilitate manual user control and automated control of the HMD 100. The control system 170 may also include a processor 190 to control operation of the components of the control system 170, both when operated manually and independently, and also when operated in response to conditions detected/sensed by the sensing system 160 in response to a command received by the control system 170.

In some embodiments, the HMD 100 may also include a camera 180 which may capture still and moving images of the real world environment and display these images to the user on the display 140 in a pass through mode. In the pass through mode, the user may be able to leave the virtual world and temporarily return to the real world without removing the HMD 100 or otherwise changing the configuration of the HMD 100 such as, for example, moving the housing 110 out of the line of sight of the user. In some embodiments, the display 140 may be a transparent display, allowing the user to view the real world environment through the display 140 in some modes of operation.

In some embodiments, the camera 180 can capture still and moving images of the real-world environment and display these images to the user on the display 140 while simultaneously displaying virtual components on the display 140 to the user in an augmented reality mode. The various sensing system devices 162-164 can sense objects in the real world environment and user movements in the real world environment (e.g., the movement of a hand of the user) and, based on this sensing, the control system 170 can allow the user to interact with virtual components displayed on the display 140 when a user "interacts" with the virtual component, such as when a user moves their hand to a location or position at which a virtual component is displayed in the display overlaid on the real world environment. When the hand of the user is detected at a location of the displayed virtual component, the control system 170 enables one or more actions associated with the user "interacting" with the virtual component to be performed, such as moving the location of the virtual component in the display 140 or initiating another action. Additional details regarding example interactions can be found below in relation to FIGS. 3 and 4.

Figure 2:
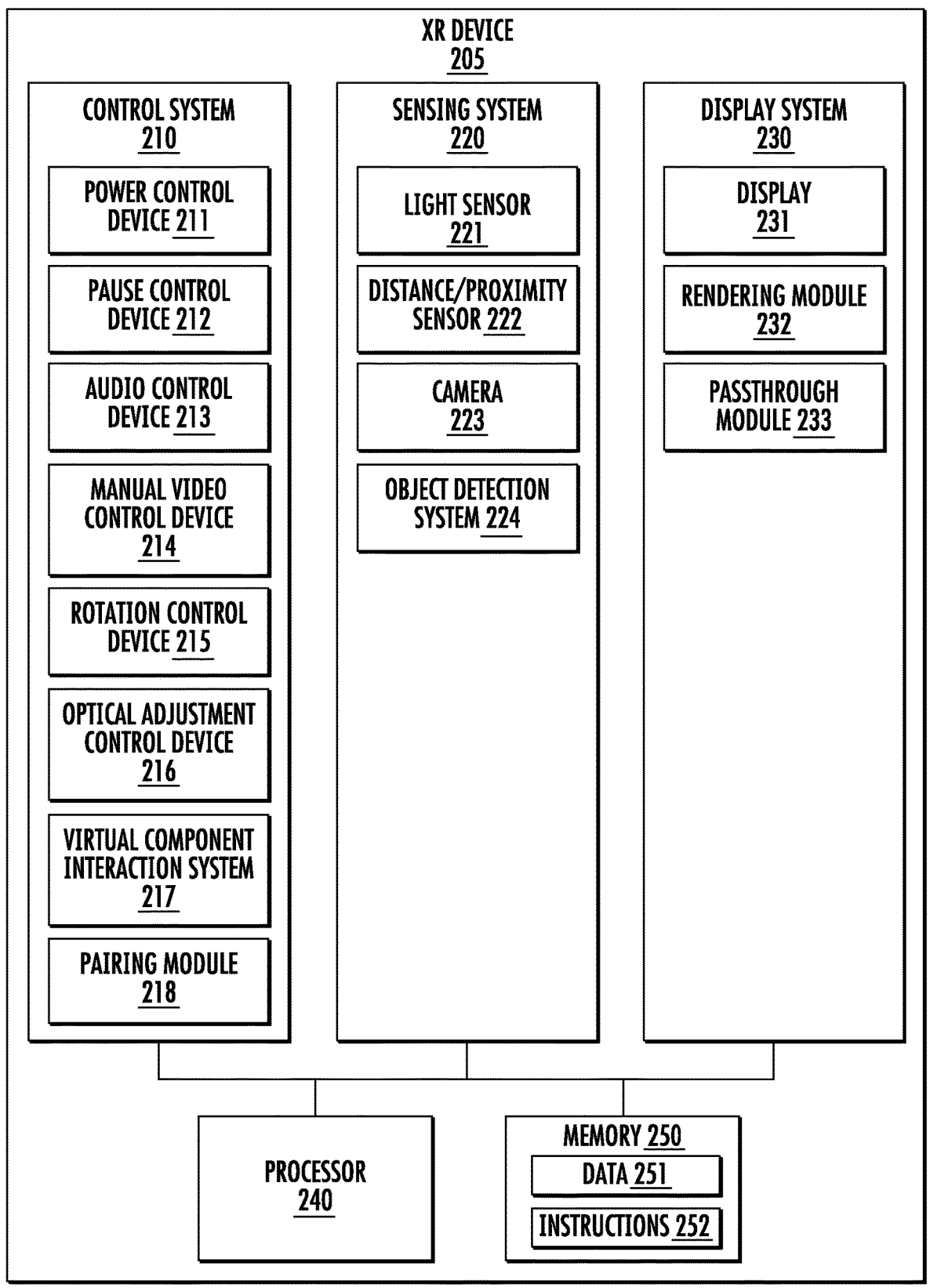
FIG. 2 depicts a block diagram of an extended-reality device according to example embodiments of the present disclosure.

A block diagram of a system 200 for displaying virtual components on a display in an HMD is illustrated in FIG. 2. The system 200 includes an XR device 205, such as the HMD described with regards to FIGS. 1A-1C. The XR device 205 can include a control system 210, a sensing system 220, a display system 230, a processor 240, and a memory 250.

The control system 210 and sensing system 220 can be similar to the control system 170 and the sensing system 160, respectively, illustrated in FIGS. 1A-1C. In the example embodiment shown in FIG. 2, the control system 210 can include a power control device 211 for controlling power usage in the XR device 205, a pause control device 212 for controlling display of virtual components or a pass through mode for the XR device 205, an audio control device 213 for controlling audio that may be provided through the XR device 205 to the user, a manual video control device 214 for controlling video display (both real world and virtual) in the XR device 205, a rotation control device 215 for controlling rotation of the housing relative to the frame, an optical adjustment control device 216 for adjusting optical components of the XR device 205, a virtual component interaction system 217, and a pairing module 218.

The virtual component interaction system 217 receives object detection data from the sensing system 220 and displayed virtual component data from the display system 230 to determine when a user is "interacting" with a displayed virtual component. For example, when a hand of a user is detected as "touching" a displayed screen that is a virtual component displayed at a position within the display of the XR device 205 (e.g., determining that the displayed screen or a graphical outline around the displayed screen and the detected hand are at the same coordinates within the display), the virtual component interaction system 217 determines a type of interaction (closing the displayed screen, moving the displayed screen to new coordinates within the display, and the like) to perform with the displayed screen. In some embodiments, the virtual component interaction system 217 can determine a type of interaction based on an identified gesture of the hand of the user. For example, the virtual component interaction system 217 can detect that the hand of the user is making a pinching gesture, which can indicate that the user wishes to reposition the displayed screen. In another example, the virtual component interaction system 217 can detect two fingers of the hand of the user "touching" a displayed screen, which can indicate that the user wishes to stop display of the displayed screen. The virtual component interaction system 217 can also generate virtual components for display, such as the display screens, outlines (bounding boxes) for identified objects, and the like.

The pairing module 218 enables the XR device 205 to pair with a separate computing device. For example, the XR device 205 can pair with a smartphone, a laptop computer, a desktop computer, or any other suitable computing device that includes a display screen for providing information to a user of the separate computing device. The XR device 205 and the separate computing device can be paired using Bluetooth™, Wi-Fi, or other wireless communication means.

When the XR device 205 and the separate computing device are paired, the XR device 205 and the separate computing device can share information, such as sharing what is being displayed by the separate computing device to the XR device 205, which can in turn display a virtual component on the display of the XR device 205 that reproduces the currently displayed screen of the separate computing device.

In order to pair the XR device 205 and the separate computing device, the pairing module 218 can identify, in the video data, a pattern or a QR code being displayed by the screen of the separate computing device. For example, the separate computing device can display a QR code that can be detected by the XR device 205. The QR code uniquely identifies the separate computing device as a device to be paired to the XR device 205. After identifying the QR code, the pairing module 218 can create a communicative coupling between the XR device 205 and the separate computing device, which allows the separate computing device to send data about the screen currently being displayed on the separate computing device to the XR device 205 for display on the display of the XR device 205.

In another embodiment, the pairing module 218 can identify a specific pattern, a specific image, or specific characters in the video data that indicate that the separate computing device is a device to pair the XR device 205. These specific patterns, images, or characters uniquely identify the separate computing device as a computing device to pair with the XR device 205. After identifying the specific pattern, image, or characters, the pairing module 218 can create a communicative coupling between the XR device 205 and the separate computing device, which allows the separate computing device to send data about the screen currently being displayed on the separate computing device to the XR device 205 for display on the display of the XR device 205.

The sensing system 220 can include a light sensor 221 for detecting light-emitting objects (such as a displayed screen from a separate computing device), a distance/proximity sensor 222 for detecting distance between the XR device 205 and one or more objects in the real-world environment of the user, a camera 223 for capturing image and video data of the real-world environment of the user, and an object detection system 224. The object detection system 224 can detect various objects in the real-world environment based on video and other data, such as detecting hands of the user using the XR device 205, other computing devices with display screens, and other relevant objects. Data associated with the detected objects can then be provided back to the control system 210, such as identity of the detected object, location in the real-world environment of the detected object, coordinates of the detected object in the display, and the like.

The display system 230 includes a display 231, a rendering module 232, and a passthrough module 233. The display 231 is a display for video data, either of the real-world environment of the user, of virtual components (such as a virtual environment and/or one or more other virtual objects), or a combination of the two. The rendering module 232 receives data from the sensing system 220 and/or the control system 210 and, based on the received data, renders virtual components for display on the display 231. The passthrough module 233 enables video data collected from a camera to be displayed instead of or in conjunction with virtual components/backgrounds on the display 233.

The processor 240 can be any suitable processing device (e.g., a processor core, a microprocessor, an ASIC, a FPGA, a controller, a microcontroller, etc.) and can be one processor or a plurality of processors that are operatively connected. The memory 250 can include one or more non-transitory computer-readable storage mediums, such as RAM, ROM, EEPROM, EPROM, flash memory devices, magnetic disks, etc., and combinations thereof. The memory 250 can store data 251 and instructions 252 which are executed by the processor 240 to cause the XR device 205 to perform operations.

It is to be understood that the XR device 205, the control system 210, the sensing system 220, and display system 230 may include more, or fewer, devices and systems depending on a particular implementation. The elements included in the XR device 205, the control system 210, and the sensing system 220 can have a different physical arrangement within the XR device 205.

Figure 3:
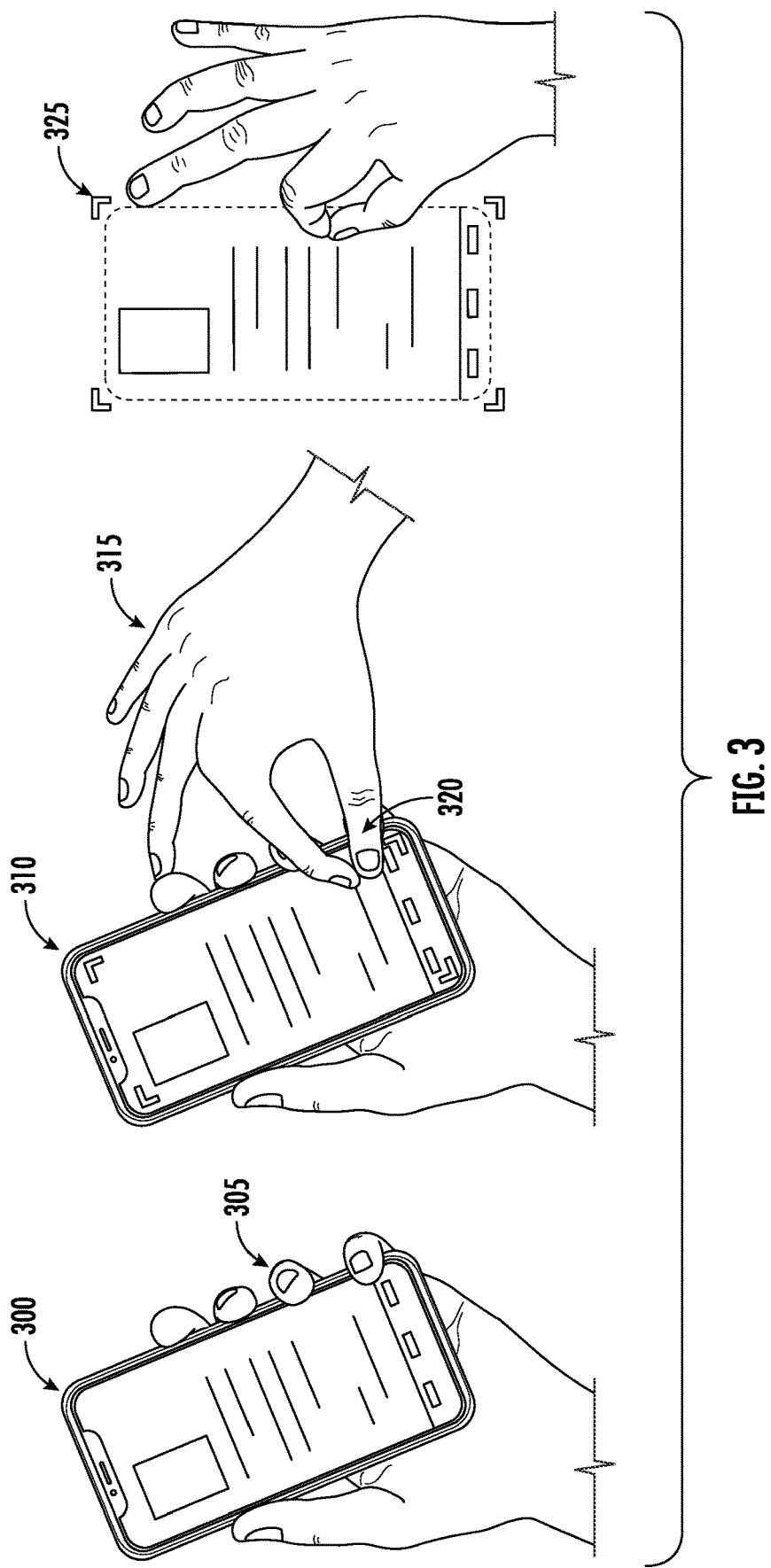
FIG. 3 depicts a virtual screen being displayed in a real-world environment according to example embodiments of the present disclosure.

FIG. 3 depicts a virtual screen 300 being displayed in a real-world environment according to example embodiments of the present disclosure. The virtual screen 300 is displayed as a graphical overlay of an actual screen of separate computing device 305 that is being displayed in a display of an XR device that is operating in a passthrough mode (e.g., displaying the real-world environment that can be seen through the XR device). The virtual screen 300 is generated by the XR device due to the XR device and the separate computing device 305 being paired with one another. The XR device generates graphical outline 310 to show a user of the XR device where the virtual screen 300 of separate computing device 305 is located, as well as enabling user interaction with the virtual screen 300.

When the XR device replicates the screen of the separate computing device 305 in the XR display environment, the virtual screen 300 may have the same resolution and layout as the physical screen of the device 305, or it may have a different resolution, size, or layout.

In cases where the XR device is replicating the screen of the separate computing device 305 with the same resolution and aspect ratio, the virtual screen 300 can have a similar resolution and layout as the physical screen. This allows for a seamless transition from the physical screen to the virtual screen 300 and enables the user to interact with the digital content in a familiar way.

However, in cases where the XR device is replicating the screen of the separate computing device 305 with a different resolution, aspect ratio, or physical size, the virtual screen 300 can be adjusted to match the user's preferences or specific use case. For example, the user can adjust the virtual screen 300 to be larger or smaller than the physical screen, or they may adjust the virtual screen 300 to have a different aspect ratio to accommodate their specific application. In one example, the virtual screen 300 can be made significantly larger so as to enable the user to view specific items in greater detail.

In such cases, the XR device can use various techniques to adjust the virtual screen 300's resolution, size, and layout. For example, the XR device may use scaling algorithms to adjust the resolution of the virtual screen 300 to match the physical screen, or it may use cropping techniques to adjust the layout of the virtual screen 300 to match the user's preferences.

According to another aspect, the XR device, using the video data, can identify when a hand 315 of the user interacts with the virtual screen 300 and/or the graphical outline 310 by, for example, detecting when a position of the hand 315 is at the same position as the virtual screen 300 and/or the graphical outline 310 in the displayed video.

The XR device can also determine a gesture 320 that the hand 315 is performing. Based on the identified gesture, different actions can be performed. For example, the gesture 320 is a pinching gesture. When the XR device determines that the user is performing a pinching gesture, the XR device determines that the user wishes to move the virtual screen 300 to a new position 325 in the display. While the user is still performing gesture 320, the action can be continued (e.g., the user can keep moving the virtual screen to new position 325 or to a different position). Once the user ceases performing the gesture 320, the action can be stopped (e.g., the virtual screen 300 is placed at the new position 325 and the user can no longer move the virtual screen 300 without again performing the gesture 320).

According to another aspect, in some implementations, multiple virtual screens corresponding to multiple devices can be combined into a single visual representation in the XR display environment. This allows the user to view and interact with content from multiple devices simultaneously, without having to switch between different physical screens or XR devices.

The combined virtual representation of multiple screens can take various forms depending on the specific application or use case. For example, the virtual screens may be arranged side-by-side, stacked vertically, or overlaid on top of each other in a specific order. The XR device can also provide various techniques for controlling and interacting with the multiple virtual screens, such as resizing or rearranging the screens, selecting which screen is the active screen, and adjusting the relative brightness or contrast of each screen.

Figure 4:
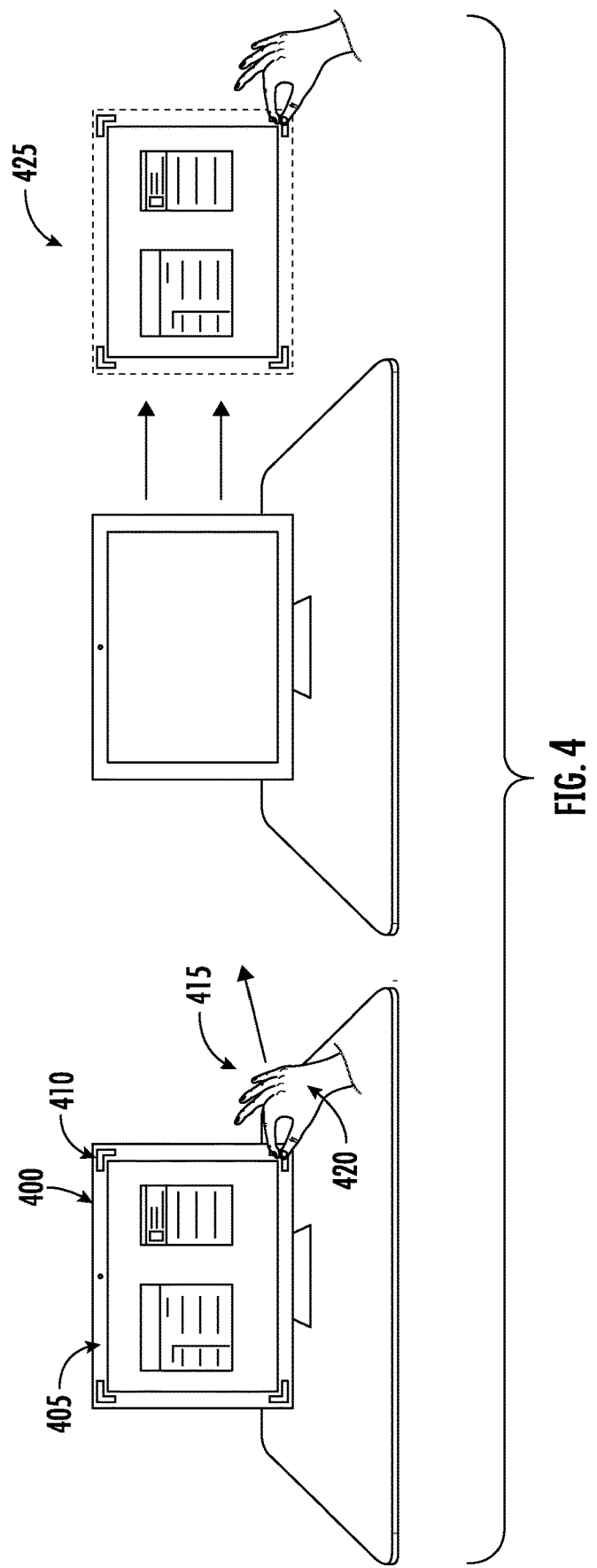
FIG. 4 depicts a virtual screen being displayed in a real-world environment according to example embodiments of the present disclosure.

FIG. 4 depicts a virtual screen 400 being displayed in a real-world environment according to example embodiments of the present disclosure. Similar to the virtual screen 300 described in FIG. 3, virtual screen 400 is a graphical overlay of an actual screen of separate computing device 405 (in this case, a desktop computer). Graphical outline 410 is generated by the XR device to show where the virtual screen 400 is located. The XR device detects hand 415 of the user performing a gesture 420 (e.g., a pinching gesture), and based on the gesture 420 detected and the position of the hand 415, the XR device performs an action, such as allowing a user to drag the virtual screen 400 to a new position 425.

Figure 5:
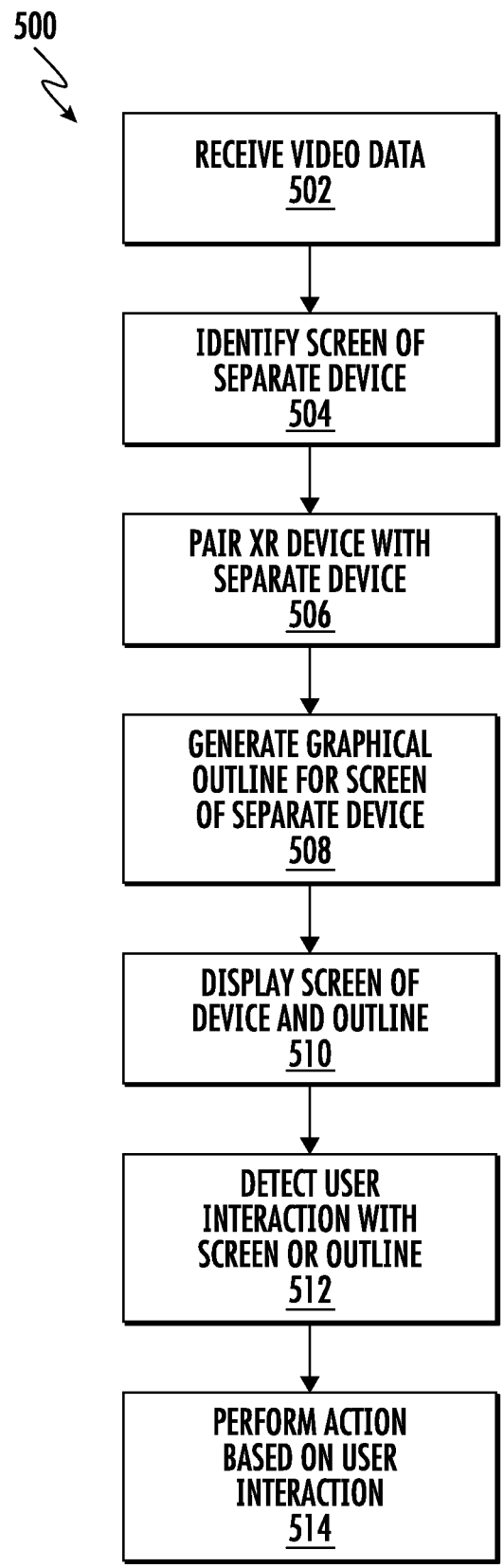
FIG. 5 depicts a flow chart of a method for displaying user device screens in a head-mounted device according to example embodiments of the Reference numerals that are repeated across plural figures are intended to identify the same features in various implementations.

FIG. 5 depicts a flow chart diagram of an example method 500 to perform according to example embodiments of the present disclosure. Although FIG. 5 depicts operations performed in a particular order for purposes of illustration and discussion, the methods of the present disclosure are not limited to the particularly illustrated order or arrangement. The various operations of the method 500 can be omitted, rearranged, combined, and/or adapted in various ways without deviating from the scope of the present disclosure.

At operation 502, a computing system can receive video data of a real-world environment of a user of an extended reality device. This data can be received, for example, from a camera of the extended reality device while the extended reality device is in a passthrough mode.

At operation 504, the computing system can identify a screen of a separate computing device in the video data. For example, the computing system can identify a QR code, a specific pattern, a specific image, or specific characters that uniquely identify the separate computing device. The computing system can detect the QR code, specific pattern, specific image, or specific characters and identify the separate computing device for pairing with the extended reality device.

In another example, the computing system use a machine learning model to recognize, detect, or identify an emissive screen from the video data captured by its sensors. This machine learning model can be trained on a dataset of various emissive screens to learn their characteristics, such as their shape, size, and color. Once trained, the model can be used by the computing system to recognize emissive screens in real-time and identify the separate computing device to pair with.

The use of machine learning in this process can improve the accuracy and reliability of identifying emissive screens, particularly in complex or dynamic environments where the screens may be partially obstructed or in motion. Additionally, the machine learning model can be continuously improved and updated over time to enhance its performance and adapt to new types of emissive screens.

At operation 506, the computing system can pair the extended reality device and the separate computing device by creating a communicative coupling (e.g., using Bluetooth™, Wi-fi, and the like).

At operation 508, the computing system can generate a graphical outline or other graphical element around or adjacent to the screen of the separate computing device. This graphical outline can be surrounding a graphical overlay that is covering the screen of the separate computing device (e.g., a virtual screen) that is currently displaying a virtual representation of what is actually being displayed on the screen of the separate computing device.

At operation 510, the computing system displays the screen of the separate computing device and the graphical outline around the screen of the separate computing device on a display of the extended reality device. For example, the computing system overlays the graphical overlay on the screen of the separate computing device and then displays the graphical outline around the graphical overlay. In some embodiments, the displayed screen on the display of the extended reality device has at least one display characteristic different from the screen being displayed on the separate computing device. For example, the screen as displayed on the separate computing device may have a size, resolution, aspect ratio, brightness, and other display characteristics, some or all of which can be dictated by the separate computing device (e.g., a particular aspect ratio for display of the screen if the separate computing device is a smartphone or a different aspect ratio for display of the screen if the separate computing device is a desktop computer). These display characteristics may need to be modified in order to display the screen on the display of the extended reality device so that content on the screen is not warped, blurry, cropped, or otherwise distorted in the display of the extended reality device. Therefore, the extended reality device can make one or more modifications to the screen to ensure clear and accurate display of the screen in the display of the extended reality device, such as modifying the size, resolution, aspect ratio, brightness, or other display characteristics.

At operation 512, the computing system detects a user interaction with the graphical outline around the screen of the separate computing device based on the received video data. For example, the computing system can detect a position of a hand of a user within the video data and determine if the hand of the user is at the same position or overlapping a position that includes the graphical overlay and/or the graphical outline. The computing system can also determine a gesture being performed by a hand of the user, such as a pinching motion, a grabbing motion, an open palm, and the like.

At operation 514, in response to detecting the user interaction, the computing system can perform an action associated with the user interaction. For example, based on the determined gesture being a pinching motion, the computing system can initiate a drag and drop action, where the user can drag the graphical overlay to a new position within the display. In another example, based on the determined gesture being a grabbing motion, the computing system can stop display of the screen and the graphical outline.

After the user performs a drag and drop motion to reposition the virtual screen within the XR display environment, the computing system can utilize sensors and tracking devices to determine the new position of the virtual screen. These technologies can accurately track the movement and orientation of the XR device, as well as any physical objects or markers placed within the environment.

Using this information, the computing system can place the virtual screen in the exact location where it was dropped by the user. This ensures that the user's interactions with the screen are accurately translated into the XR display environment and that the virtual screen behaves in a natural and intuitive manner.

In addition to allowing the user to interact with virtual screens in the XR display environment, the computing system can also communicate these interactions back to the paired computing device. For example, if the user types on a virtual keyboard displayed in the XR environment, the computing system can relay the text input back to the paired computing device, which can then process the input and display the corresponding output.

Similarly, if the user performs a gesture on the virtual screen, such as swiping or pinching, the computing system can translate this into a corresponding action on the paired computing device. This allows the user to seamlessly interact with the virtual screen in the XR environment, while still utilizing the computing power and functionality of the paired device.

Overall, this two-way communication between the XR device and the paired computing device allows for a more integrated and streamlined user experience, where virtual and physical interfaces can be used in tandem to achieve desired tasks.

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method for displaying a screen in extended reality, the method comprising:
   receiving, by a processor, video data of a real-world environment of a user of an extended reality device;
   identifying, by the processor, a screen of a separate computing device in the video data;
   pairing, by the processor, the extended reality device and the separate computing device;
   generating, by the processor, a graphical outline around the screen of the separate computing device;
   displaying, by the processor, the screen of the separate computing device and the graphical outline around the screen of the separate computing device on a display of the extended reality device, wherein the displayed screen on the display of the extended reality device has at least one display characteristic different from the screen being displayed on the separate computing device;
   detecting, by the processor, a user interaction with the graphical outline around the screen of the separate computing device based on the received video data; and
   in response to detecting the user interaction, performing, by the processor, an action associated with the user interaction.

2. The computer-implemented method of claim 1, wherein the video data of the real-world environment of the user is received when the extended reality device is set to operate in a passthrough mode.

3. The computer-implemented method of claim 1, wherein identifying the screen of the separate computing device comprises:
   identifying, by the processor, at least one image or pattern displayed on the screen of the separate computing device; and
   based on the identification of the at least one image or pattern, uniquely identifying the separate computing device for pairing to the extended reality device.

4. The computer-implemented method of claim 1, wherein identifying the screen of the separate computing device comprises:
   identifying, by the processor, a QR code displayed on the screen of the separate computing device; and
   based on the identification of the QR code, uniquely identifying the separate computing device for pairing to the extended reality device.

5. The computer-implemented method of claim 1, wherein displaying the screen of the separate computing device and the graphical outline comprises:
   determining, by the processor, a position of the screen in the display of the extended reality device;
   generating, by the processor, a graphical overlay of the screen;
   displaying, by the processor, the graphical overlay of the screen at the position of the screen; and
   displaying, by the processor, the graphical outline around the graphical overlay of the screen.

6. The computer-implemented method of claim 5, wherein detecting the user interaction with the graphical outline comprises:
   determining, by the processor, a position of a hand of the user in the video data; and
   determining, by the processor, that the position of the hand in the video data overlaps a position of the graphical outline.

7. The computer-implemented method of claim 6, wherein detecting the user interaction with the graphical outline further comprises:
   determining, by the processor, a gesture of the hand of the user; and
   based on the determined gesture, selecting, by the processor, the action to perform.

8. The computer-implemented method of claim 1, wherein the action includes moving the displayed screen and the graphical outline to a new position in the display of the extended reality device.

9. A computing system for displaying screens in extended reality, comprising:
   one or more processors; and
   one or more non-transitory computer-readable media that store instructions that, when executed by the one or more processors, cause the computing system to perform operations, the operations comprising:
      receiving video data of a real-world environment of a user of an extended reality device;
      identifying a screen of a separate computing device in the video data;
      pairing the extended reality device and the separate computing device;
      generating a graphical outline around the screen of the separate computing device;
      displaying the screen of the separate computing device and the graphical outline around the screen of the separate computing device on a display of the extended reality device, wherein the displayed screen on the display of the extended reality device has at least one display characteristic different from the screen being displayed on the separate computing device;
      detecting a user interaction with the graphical outline around the screen of the separate computing device based on the received video data; and
      in response to detecting the user interaction, performing an action associated with the user interaction.

10. The computing system of claim 9, wherein the video data of the real-world environment of the user is received when the extended reality device is set to operate in a passthrough mode.

11. The computing system of claim 9, wherein identifying the screen of the separate computing device comprises:
   identifying at least one image or pattern displayed on the screen of the separate computing device; and
   based on the identification of the at least one image or pattern, uniquely identifying the separate computing device for pairing to the extended reality device.

12. The computing system of claim 9, wherein identifying the screen of the separate computing device comprises:
   identifying a QR code displayed on the screen of the separate computing device; and
   based on the identification of the QR code, uniquely identifying the separate computing device for pairing to the extended reality device.

13. The computing system of claim 9, wherein displaying the screen of the separate computing device and the graphical outline comprises:
- determining a position of the screen in the display of the extended reality device;
- generating a graphical overlay of the screen;
- displaying the graphical overlay of the screen at the position of the screen; and
- displaying the graphical outline around the graphical overlay of the screen.

14. The computing system of claim 13, wherein detecting the user interaction with the graphical outline comprises:
- determining a position of a hand of the user in the video data; and
- determining that the position of the hand in the video data overlaps a position of the graphical outline.

15. The computing system of claim 14, wherein detecting the user interaction with the graphical outline further comprises:
- determining a gesture of the hand of the user; and
- based on the determined gesture, selecting the action to perform.

16. One or more non-transitory computer-readable media that store instructions that, when executed by one or more processors, cause the one or more processors to perform operations, the operations comprising:
- receiving video data of a real-world environment of a user of an extended reality device;
- identifying a screen of a separate computing device in the video data;
- pairing the extended reality device and the separate computing device;
- generating a graphical outline around the screen of the separate computing device;
- displaying the screen of the separate computing device and the graphical outline around the screen of the separate computing device on a display of the extended reality device, wherein the displayed screen on the display of the extended reality device has at least one display characteristic different from the screen being displayed on the separate computing device;
- detecting a user interaction with the graphical outline around the screen of the separate computing device based on the received video data; and
- in response to detecting the user interaction, performing an action associated with the user interaction.

17. The one or more non-transitory computer-readable media of claim 16, wherein identifying the screen of the separate computing device comprises:
- identifying at least one image or pattern displayed on the screen of the separate computing device; and
- based on the identification of the at least one image or pattern, uniquely identifying the separate computing device for pairing to the extended reality device.

18. The one or more non-transitory computer-readable media of claim 16, wherein identifying the screen of the separate computing device comprises:
- identifying a QR code displayed on the screen of the separate computing device; and
- based on the identification of the QR code, uniquely identifying the separate computing device for pairing to the extended reality device.

19. The one or more non-transitory computer-readable media of claim 16, wherein displaying the screen of the separate computing device and the graphical outline comprises:
- determining a position of the screen in the display of the extended reality device;
- generating a graphical overlay of the screen;
- displaying the graphical overlay of the screen at the position of the screen; and
- displaying the graphical outline around the graphical overlay of the screen.

20. The one or more non-transitory computer-readable media of claim 19, wherein detecting the user interaction with the graphical outline comprises:
- determining a position of a hand of the user in the video data; and
- determining that the position of the hand in the video data overlaps a position of the graphical outline.

* * * * *